(12) United States Patent
Brandau

(10) Patent No.: US 12,008,857 B2
(45) Date of Patent: *Jun. 11, 2024

(54) PUSH-BUTTONS FOR GAMING MACHINES

(71) Applicant: AGS LLC, Las Vegas, NV (US)

(72) Inventor: Mark Robert Brandau, Johns Creek, GA (US)

(73) Assignee: AGS LLC, Las Vegas, NV (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/693,701

(22) Filed: Mar. 14, 2022

(65) Prior Publication Data
US 2022/0198872 A1 Jun. 23, 2022

Related U.S. Application Data

(60) Continuation of application No. 16/719,549, filed on Dec. 18, 2019, now Pat. No. 11,276,268, which is a division of application No. 15/704,295, filed on Sep. 14, 2017, now Pat. No. 10,515,508.

(51) Int. Cl.
G06F 3/041 (2006.01)
A63F 13/285 (2014.01)
G06F 3/02 (2006.01)
G07F 17/32 (2006.01)
H01H 13/02 (2006.01)

(52) U.S. Cl.
CPC ........ G07F 17/3209 (2013.01); A63F 13/285 (2014.09); G06F 3/0202 (2013.01); H01H 13/023 (2013.01)

(58) Field of Classification Search
CPC ............ G07F 17/3202; G07F 17/3209; H01H 13/023; H01H 13/18; G06F 3/0202
See application file for complete search history.

(56) References Cited

U.S. PATENT DOCUMENTS

| | | |
|---|---|---|
| 4,987,279 A | 1/1991 | Hirose et al. |
| 6,987,233 B2 | 1/2006 | Cole |
| 8,488,069 B2 | 7/2013 | Dimitrov |
| 9,563,305 B2 | 2/2017 | Dimitrov |
| 10,043,338 B2 | 8/2018 | Sumi |
| 2004/0118669 A1 | 6/2004 | Mou |
| 2006/0108210 A1 | 5/2006 | Katayama et al. |
| 2006/0181517 A1 | 8/2006 | Zadesky et al. |
| 2007/0060291 A1 | 3/2007 | Cole |
| 2007/0060352 A1 | 3/2007 | Cole |
| 2007/0077984 A1 | 4/2007 | Aida et al. |

(Continued)

OTHER PUBLICATIONS

Wikipedia, "Hall effect sensor", https://en.wikipedia.org/wiki/Hall_effect_sensor, accessed Jun. 21, 2018, 5 pages.

(Continued)

Primary Examiner — Lawrence S Galka
(74) Attorney, Agent, or Firm — WEIDE & MILLER, LTD.

(57) ABSTRACT

Push-button switches and components thereof, including push-button switch button covers, as well as methods of making the same and gaming machines having such push-button switches, are provided. The push-button switches are low profile and configured for aperture-free mounting, and the button covers are configured to convey information and have improved characteristics.

20 Claims, 6 Drawing Sheets

(56) References Cited

U.S. PATENT DOCUMENTS

| | | |
|---|---|---|
| 2009/0218207 A1 | 9/2009 | Mou |
| 2010/0026635 A1* | 2/2010 | Dimitrov .............. G06F 3/0219 |
| | | 345/173 |
| 2010/0116629 A1 | 5/2010 | Borissov |
| 2010/0120534 A1 | 5/2010 | Borissov |
| 2010/0227689 A1 | 9/2010 | Brunet de Courssou et al. |
| 2010/0323791 A1 | 12/2010 | Kim et al. |
| 2011/0016721 A1 | 1/2011 | Schnak et al. |
| 2011/0111852 A1 | 5/2011 | Cohen et al. |
| 2012/0307479 A1 | 12/2012 | Toh |
| 2013/0153387 A1 | 6/2013 | Toh |
| 2014/0008188 A1 | 1/2014 | Sakamoto et al. |
| 2014/0094308 A1 | 4/2014 | Lesley et al. |
| 2014/0168937 A1 | 6/2014 | Kato et al. |
| 2015/0092387 A1 | 4/2015 | Na |
| 2015/0348362 A1 | 12/2015 | Okazaki |

OTHER PUBLICATIONS

Panasonic, "Light Touch Switch Design Guide", Copyright © 2017, 14 pages.

Bally, "Alpha 2 Pro Wave", https://www.sggaming.com/games/bally/alpha-2-pro-wave, accessed Jun. 21, 2018, 6 pages.

Gamesman, Push Buttons: By Profile, http://www.gamesman.co.uk/buttons.html, accessed Jun. 21, 2018, 1 page.

SuzoHapp, Pushbuttons & Push Buttons, https://na.suzohapp.com/products/pushbuttons/, accessed Jun. 21, 2018, 95 pages.

Vervehd, aristocrat2012, http://www.aristocrat-us.com/vervehd, accessed Jun. 21, 2018, 1 page.

Wikipedia, "Physical vapor deposition", https://en.wikipedia.org/wiki/Physical_vapor_deposition, accessed Jun. 21, 2018, 3 pages.

2002 BMW 740 Li Model Interior Pictures, 4 pages.

\* cited by examiner

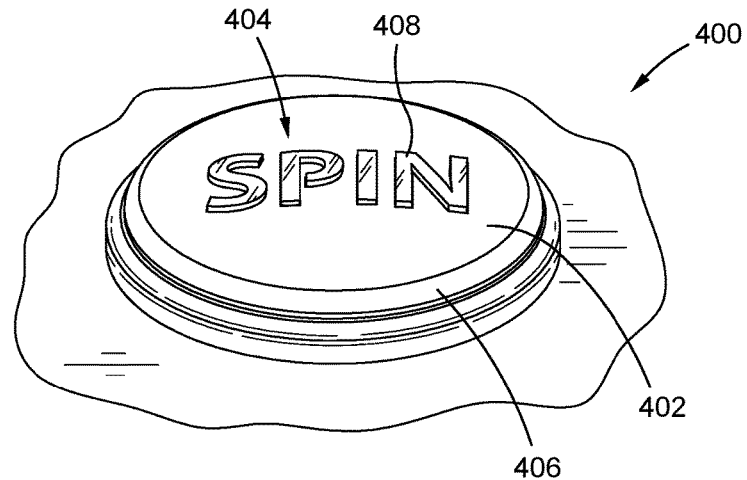
FIG. 4A
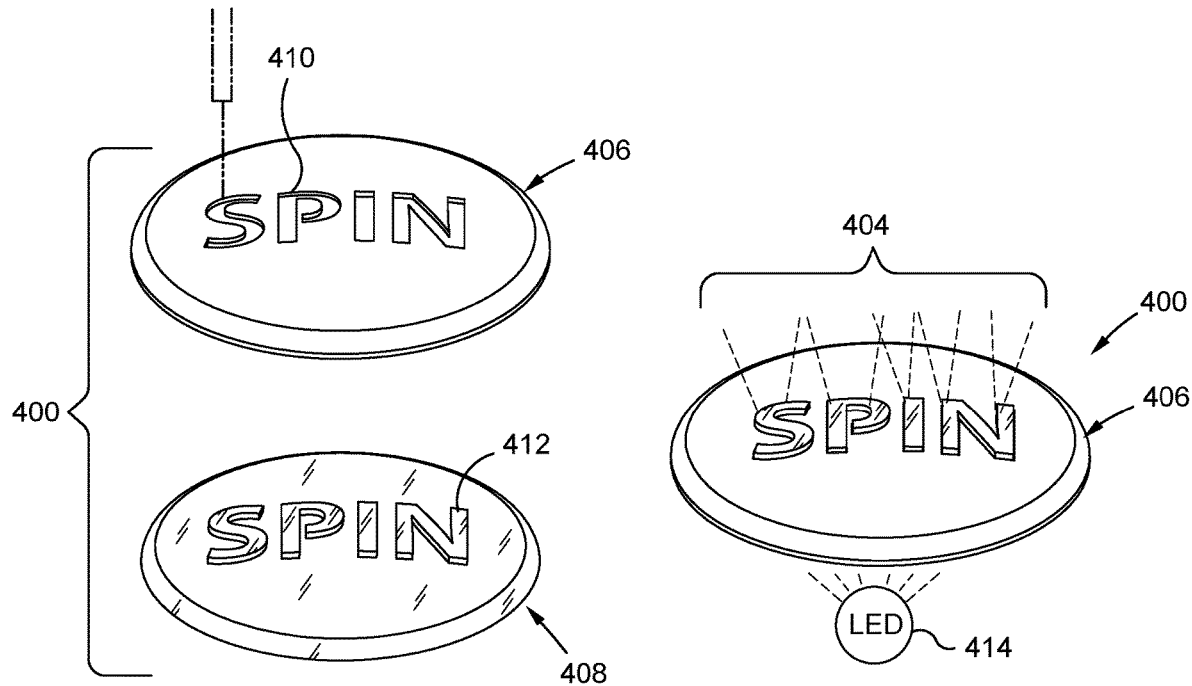
FIG. 4B  FIG. 4C

PUSH-BUTTONS FOR GAMING MACHINES

RELATED APPLICATION DATA

This application is a continuation of U.S. application Ser. No. 16/719,549, mailed Jan. 14, 2020, is a divisional of U.S. application Ser. No. 15/704,295, filed Sep. 14, 2017, which prior applications are incorporated by reference as if set forth herein in their entirety.

FIELD OF THE INVENTION

The present invention relates to player push-buttons for gaming machines.

BACKGROUND OF THE INVENTION

Wagering gaming machines such as slot machines and video poker machines generally include one or more player input devices such as push-buttons. The configuration of these buttons is very important. First, they are very visible to players and thus the aesthetic design or appearance of the buttons is very important. Second, these buttons may see tremendous duty cycles over their lifetime and must thus be very durable and reliable. For example, aside from simply functioning to receive and transmit a player's input, the buttons must be able to withstand electric shocks, drink spills and the like. Also, the "feel" of the button is very important to players. Buttons which do not provide feedback to the player of an input can be frustrating to players, but buttons which are hard to push are also undesirable.

Existing buttons have various drawbacks relating to these and other issues. As examples, many push-buttons utilize button covers or caps which are made of plastic. These plastic buttons can crack and wear and often have an undesirable "feel" to them (such as by feeling flimsy, hollow or the like).

An object of the invention is to provide an improved push-button, such as for use with wagering type gaming machines.

SUMMARY OF THE INVENTION

Embodiments of the invention comprise push-button switches and components thereof, including push-button switch button covers, as well as methods of making the same and gaming machines having such push-button switches.

One embodiment of the invention comprises a push-button switch which may be low profile and/or does not require a deck mounting aperture, and a gaming machine including at least one such push-button switch. In one embodiment, the push-button comprises a base having a top side and an opposing bottom side; a cover stop extending upwardly from the top side of the base; an annular ring connected to the base, the annular ring defining a central opening and at least one peripheral inset; a button cover movable between a first undepressed position and a second depressed position, the button cover having a central portion located at the central opening of the annular ring, a peripheral wall which extends downwardly from the central portion at one or more locations; means for generating a tactile feedback when the button cover is moved to the second depressed position; and an input/output mechanism which generates an output in response to movement of the button cover from the first undepressed position to the second depressed position, the input/output mechanism comprising at least one actuator movable downwardly when the button cover is moved from the first undepressed position to the second depressed position, and at least one detector generating an output in response to the detection of movement of the at least one actuator. In embodiments of the invention, the means for generating a tactile feedback may comprise one or more of a tactile dome which underlies the button cover, a resilient pad which is positioned below the button cover, such as under a peripheral tab which extends outwardly from the peripheral wall thereof, or a discontinuity in the button cover which allows a portion of the button cover, such as the peripheral wall portion, to deflect or deform.

When mounted to a gaming machine, the base of the push-button switch is mounted to a top surface of a deck, with the actuator positioned above the top surface of the deck. The at least one detector is positioned below a bottom surface of the deck. The deck may comprise, for example, a glass panel, such as of a video display, or a metal panel.

Advantageously, the push-button may be low in profile and, when the actuator/detector comprises a Hall-effect type sensor where the detector can detect remote movement of the actuator, the push-button can be mounted without an aperture through the deck of the gaming machine.

Another embodiment of the invention comprises a button cover for a push-button switch and a push-button having a button cover, wherein the button cover comprises a glass body having a top side and a bottom side and a peripheral edge, wherein either the top side or the bottom side has a background area of a first level of transparency and one or more information defining areas having a second level of transparency which is different than the first level.

In one embodiment, for example, all but information defining areas of the top or bottom side of the glass body are painted, frosted or coated so as to have a lower level of transparency than the information defining areas. In another embodiment, the information defining areas are painted, frosted, coated or the like so as to have a lower level of transparency than the background area. In this manner, when a light-emitting source is positioned below the button cover, different amounts of light are permitted to pass through the background and information defining areas, thus causing a user or player to perceive information.

Another embodiment of the invention comprises a button cover for a push-button switch and push-button having a button cover, wherein the button cover comprises a metal body having a top side and an opposing bottom side and a peripheral edge, one or more apertures through the body from the top side to the bottom side, and a least one transparent insert mounted to the body, with at least a portion of the insert preferably located in the one or more apertures.

In one embodiment, the one or more apertures have the shape of information to be conveyed. The insert is mounted to the bottom side of the metal body and the insert has projecting areas having the same shape as the apertures which extend into the apertures. When a light-emitting source is in a position below the button cover, light is permitted to pass through the insert and the aperture(s) in the body, thus causing a user or player to perceive information.

Yet another embodiment of the invention comprises a button cover for a push-button switch and a push-button having a button cover, wherein the button cover comprises a body having a top side, an opposing bottom side and a peripheral edge, the bottom side having a background area surrounding one or more information defining areas, the background area having first level of transparency which is lower than a level of transparency of the one or more information defining areas, and a thin film which is applied by a thin film vacuum deposition process over the top side of the body.

In one embodiment, for example, all but information defining areas of the bottom side of the body are painted or coated. The thin film may comprise a metallic film. When the button cover is not illuminated, the button cover has a solid metallic appearance. However, when the button cover is illuminated, light passes through the information defining areas and the thin film, thus causing a user or player to perceive information.

The button covers of the present invention may be applied to buttons having various configurations, including buttons which are configured to be flushed-mounted relative to a button device, such as to have only the button cover portion of the button extend above the button deck.

Further objects, features, and advantages of the present invention over the prior art will become apparent from the detailed description of the drawings which follows, when considered with the attached figures.

DESCRIPTION OF THE DRAWINGS

FIGS. 4A-4C illustrate a button cover in accordance with another embodiment of the invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise push-buttons and methods of making and using push-buttons (and/or components thereof). The push-buttons of the invention have particular utility to gaming devices such as gaming machines which are configured to present wager-based games, and may thus be referred to as gaming machine push-buttons. However, it will be appreciated that various aspects of the invention may be applied to other environments or devices.

As noted, embodiments of the invention have particular utility to gaming machines. Such a gaming machine may have various configurations. The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
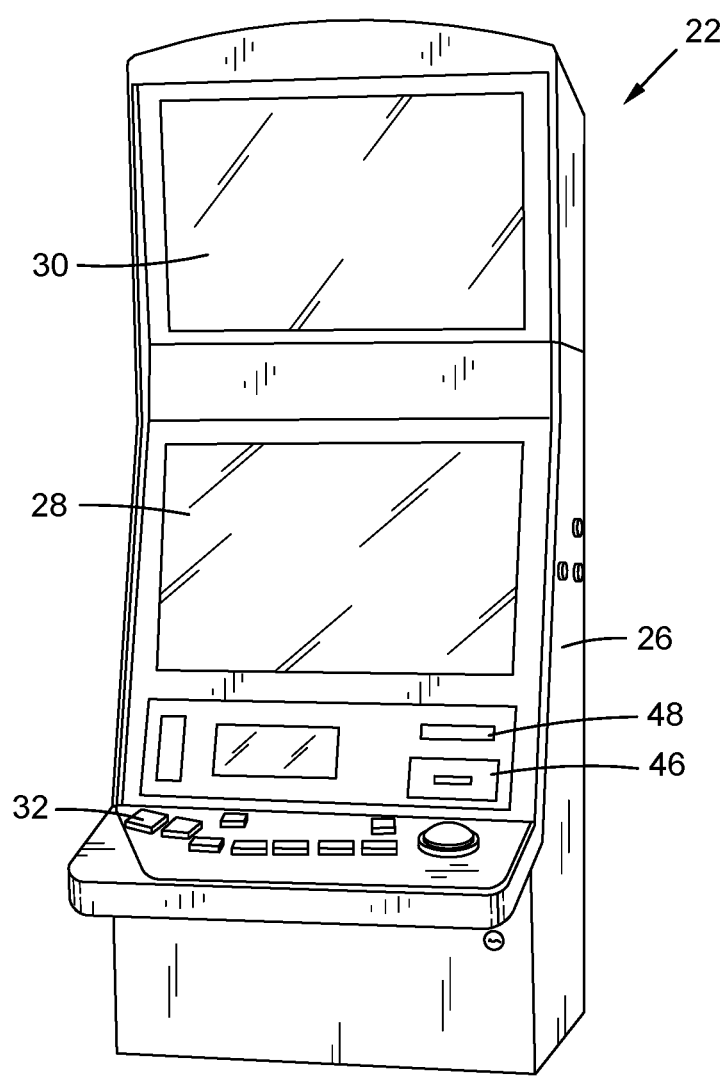
FIG. 1 is a perspective view of one embodiment of a gaming machine in accordance with the invention.

One configuration of a gaming machine 22 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one first display device 28 configured to display game information. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. The gaming machine 22 might include more than one display device, such as a main or first display device 28 and a secondary display device 30. The two or more display devices might be associated with the housing or, as illustrated in FIG. 1, the gaming machine 22 might also include a top box or other portion which includes the one or more second display devices 30. Also, the gaming machine 22 might include side displays (such as mounted to the exterior of the housing 26) and might include multiple displays of differing sizes.

While the display devices may comprise one or more video displays (such as for presenting video poker, video slots or other video-based games), in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

As described in more detail below, the gaming machine 22 is preferably configured to present one or more games upon a player making a monetary payment or wager. In this regard, as described in more detail below, the gaming machine 22 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 32. While such input devices might comprise a touch-screen display, joystick, touch-pad or the like, in a preferred embodiment, one or more of the input devices comprises a push-button as disclosed herein. These one or more devices 32 may be utilized by the player to facilitate game play, such as by providing input or instruction to the gaming machine 22. For example, such input devices 32 may be utilized by a player to place a wager, cause the gaming machine 22 to initiate a game, to initiate a reel spin, to "cash out" of the gaming machine, or to provide various other inputs.

Although not illustrated, in one embodiment, the gaming machine 22 includes at least one microprocessor or controller for controlling the gaming machine, including receiving player input and sending output signals for controlling the various components or peripheral devices of the machine 22 (such as generating game information for display by the display devices 28,30). The controller may be arranged to receive information regarding funds provided by a player to the gaming machine 22, receive input such as a purchase/bet signal when a purchase/bet button is depressed, and receive other inputs from a player. The controller may be arranged to generate information regarding a game, such as generating game information for display by the at least one display device 28,30 (such as information comprising slot game symbols, images of playing cards or other game information), for determining winning or losing game outcomes and for displaying information regarding awards for winning game outcomes, among other things.

The controller may be configured to execute machine readable code or "software" or otherwise process information, such as obtained from a remote server. Software or other instructions may be stored at a memory or data storage device, e.g. in a fixed or non-transitory configuration. The memory may also store other information or data, such as data stored in table or other forms (including, but not limited to look-up tables, pay tables and other information including tracked game play information). The gaming machine 22 may also include one or more random number generators for generating random numbers (such as implemented by a random number generator software module stored in the memory and executable by the processor), such as for use in selecting slot symbols, playing cards and the like, and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine readable code or instructions (e.g. software) which are configured to implement the game. In this regard, the gaming machine 22 is specially configured to present the game of the invention via specific software and/or hardware which causes the gaming machine to operate uniquely. For example, the controller of the gaming machine 22 may be configured to detect a wager, such as a signal from a player's depressing of the "bet one" button (such as one of the buttons 32). Upon such an event and/or the player otherwise signaling the gaming machine to present the game, the controller may be configured to cause the at least one display 28 to display unique information, such as a unique graphical interface or unique game display, including game symbols or other game information (such as graphically represented images of cards, slot symbols, dice, etc.). The controller may accept input from a player of game inputs, such as a request to spin reels or the like, via the one or more player input devices of the gaming machine 22. As indicated above, the machine-readable code may be configured in various manners, such as by having various "modules" of software which are designed to implement specific features of the game play or game presentation.

The gaming machine 22 may be configured to generate and present games in a stand-alone manner or it may be in communication with one or more external devices or systems at one or more times. The gaming machine 22 might communicate with one or more of such external devices or systems via one or more communication ports or other interface devices. These ports or interface devices may be configured to implement various communication protocols (including proprietary protocols) and communicate via wireless, wired or other communication links. For example, the gaming machine 22 may be configured as a server based device and obtain game code or game outcome information from a remote game server (in which event the gaming machine controller may receive game information from the server, such as game outcome information, and use that server-generated information to present the game at the gaming machine). For example, the gaming machine 22 might be configured as a stand-alone device or as a server-based device for presenting games as Class III games (as defined by the U.S. Indian Gaming Regulatory Act) or as a server-based device for presenting games as Class II games (as defined by the U.S. Indian Gaming Regulatory Act).

As indicated, the gaming machine 22 is configured to present one or more wagering games. The gaming machines 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, the gaming machine 22 might include a coin acceptor for accepting coins. Of course, associated coin reading/verifying devices and coin storage devices may be associated with the gaming machine 22 if it is configured to accept coins. Likewise, as illustrated in FIG. 1, the gaming machine 22 might include a media reader 46. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button (such as implemented via one of the buttons 32) or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 22 may include one or more media printers or writers 48. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and/or an associated keypad or other input device (such as a touch screen display). Such player tracking devices are well known and may permit the game operator to track play of players of the gaming machine. The tracked play may be utilized to offer player bonuses or awards.

Although not illustrated, the main game controller or processor may communicate with several of the peripheral devices via one or more intermediary controllers. For example, some of the peripheral devices might comprise USB type or enabled devices which are controlled by an intermediary USB controller. For example, one or more of the push-buttons of the present invention might comprise USB type devices.

A casino may have numerous such gaming machines 22, such as located on a casino floor or in other locations. Of course, such gaming machines 22 might be used in other environments, such as an airport, a bar or tavern or other locations.

It will be appreciated that the gaming machine illustrated in FIG. 1 is only exemplary of one embodiment of a gaming machine. For example, it is possible for the gaming machine to have various other configurations, including different shapes and styles and having different components than as just described.

For example, in a server-based environment, a controller at a server may generate game information and transmit that information to a local controller at the gaming machine. The local controller at the gaming machine may then cause game information to be displayed on one or more associated displays.

The gaming machine 22 may, as noted above, be part of a system which includes other devices. For example, the gaming machine 22 may communicate with one or more casino systems, such as a player tracking server or system, an accounting system or server, a ticketing system, a bonusing system, a tournament system, other gaming machines, and external devices.

One embodiment of the invention is a push-button. The push-button is configured to receive input from a user in the form of a pressing of a button cover of the push-button and, in response thereto, generate at least one output, such as an electric signal or data. As indicated herein, such a push-button is preferably associated with a gaming machine 22 and is configured to receive an input from a player and, in response thereto, generate one or more outputs to the gaming machine (such as signals or data which are transmitted to the gaming machine's controller). Additional aspects of the invention comprise push-button components, such as button covers or caps, and methods of making and using push-buttons and push-button components.

FIGS. 2A through 2D illustrate embodiments of a push-button 200 in accordance with the invention.

Figure 2A:
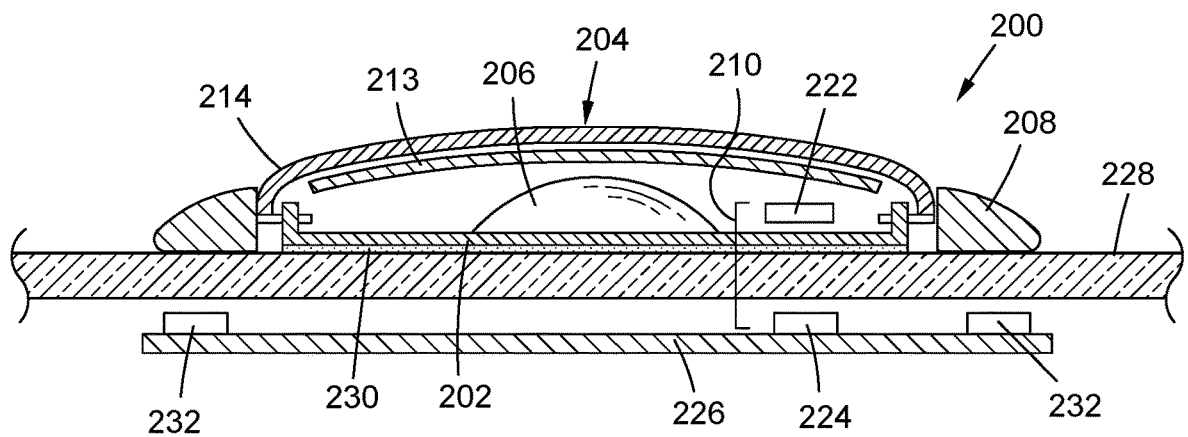
FIG. 2A illustrates one embodiment of a push-button in accordance with an embodiment of the invention.

Referring to FIG. 2A, in one embodiment, the push-button 200 comprises a base 202, a button cover or cap 204, a ring 208 and an I/O (input receiving and output generating) mechanism 210. The push-button 200 may have various shapes, such as being generally circular in shape (but it could have other overall shapes, such as oval, general square or rectangular, etc.)

In one embodiment, the base 202 is generally planar and has a top side and a bottom side. The base 202 may have the same general shape as the push-button 200, such as having a circular peripheral shape.

The button cover 204 is preferably mounted for actuation or movement relative to the base 202 and ring 208. In one embodiment, the button cover 204 has a central portion 212 which is generally dome-shape (or convex—extending away from the base 202) and a peripheral wall 214 which extends downwardly from the central portion 212 at the periphery thereof. The button cover 204 may be connected or mounted to the base 202 and ring 208 for movement in various fashions, such as by inter-engaging tabs/slots or grooves or other elements.

The ring 208 is preferably annular in shape, having a central circular opening in which the central portion 212 of the button cover 204 is located for access by a user. The ring 208 may be connected to the base 202 in various manners, such as by an upwardly extending wall or tabs at the periphery of the base 202 (which may, for example, engages a slot, detents or the like in the ring 208), or by inter-engaging threads, other mechanisms, by adhesive or the like.

In one embodiment, the ring 208 is transparent or semi-transparent to allow light to pass therethrough. The ring 208 may, for example, be constructed from plastic. In other embodiments, it is possible for the ring 208 to be constructed of other materials, such as metal or the like. As noted below, when the ring 208 is constructed from a transparent or translucent material, back-lighting may be used to illuminate the ring 208, thereby accentuating or drawing attention to the location of the button cover 204.

Importantly, the button cover 204 is mounted for movement. In one embodiment, the button cover 204 is movable between a first undepressed or raised position and a second depressed or lowered position.

In a preferred embodiment, the button 200 includes means for providing tactile actuation feedback to the user. In particular, the button 200 is preferably configured to generate a tactile output in response to a user's input to the button 200, namely the user's depression of the button cover 204 to an actuated position.

In one embodiment, the means for providing or generating a tactile output or feedback comprises a tactile dome 206 which is located on the top side of the base 202, such as by being mounted thereto. The tactile dome 206 extends outwardly or upwardly from the base 202, preferably in the center thereof. The tactile dome 206 may have various shapes. In one embodiment, the tactile dome 206 is dome shaped. As described below, the tactile dome 206 is configured to deflect or deform when a downward force is applied thereto, such as upon contact by the button cover 204, and to then return to its original shape/position when a force is no longer applied thereto. Preferably, the deflection or deformation of the tactile dome 206 creates a tactile output which can be felt by the user.

FIG. 2A illustrates the button cover 204 in its undepressed position. In this position, the button cover 204 extends outwardly from the base 202 a first distance. When a user or player presses downwardly on the button cover 204, it moves downwardly to its second depressed or actuated position and into contact with the tactile dome 206. When sufficient force is applied to the button cover 204, it not only contacts the tactile dome 206, but deflects or deforms the tactile dome 206. As this occurs, the user or player feels a "click" or other tactile output from the tactile dome 206. The user or player may also hear a "click" or other output as a result of that same deformation. This output provides feedback to the user or player that they have successfully depressed the button cover 204 to a point where it has been actuated (e.g. has moved sufficiently to register the player's input).

Once the user or player stops depressing the button cover 204, it preferably moves back to its first undepressed position. In one embodiment, the button cover 204 is biased to the raised, undepressed position. Further, when the button cover 204 is no longer in contact with the tactile dome 206, the tactile dome 206 preferably also moves back to its undeflected or undeformed state or position, as illustrated in FIG. 2A.

As noted above, the push-button 200 includes an I/O mechanism 210. The I/O mechanism 210 is configured to receive an input as a result of a user's or player's actuation of the button cover 204 and to generate an output. The output may comprise, for example, an electrical signal, data or the like. As noted above, such an output may be transmitted to a gaming machine controller or the like for use in registering a player's input.

In one embodiment, the I/O mechanism 210 comprises a Hall-effect sensor. The principles of such sensors are well known to those of ordinary skill in the art. In accordance with the present invention, at least one actuator 222 of the Hall-effect sensor is configured for movement with or by the button cover 204 relative to at least one detector 224 of the Hall-effector sensor. As illustrated in FIG. 2A, in one embodiment, the actuator 222 may be mounted on the button cover 204 for movement with the button cover 204. However, the actuator 222 could be mounted on another portion of the push-button 200 and be moved as a result of movement of the button cover 204. The actuator 222 may comprise, for example, a magnet.

The detector 224 is preferably mounted in a fixed position and is configured to detect movement of the actuator 222 (such as movement of the actuator downwardly towards the deck and thus the detector). In one embodiment, the actuator 222 is configured to generate an output, such as an electrical signal, when the user depresses the button cover 204 (and the actuator 222 moves towards/close to the detector 224). The electronic signal might be output to the gaming machine controller. However, in a preferred embodiment, the signal is output to a controller, such as associated with a printed circuit board 226. The controller may then amplify, modify or convert that signal, such as to make it compatible for receipt by the gaming machine controller.

A preferred aspect of the push-button 200 is that it can be mounted to a supporting surface without the requirement for a mounting aperture through the supporting surface. As illustrated in FIG. 2A, the push-button 200 may be mounted to a button deck 228. This deck might comprise, for example, glass (for example, the push-button might be mounted to an LED or LCD panel with or without a touch screen).

In this embodiment, the base 202 and associated button cover 204 and ring 208 are located at the top side of the deck 228. In one embodiment, an adhesive layer 230 is applied to the bottom side of the base 202 and that adhesive layer 230 is used to adhere the base and associated components to the top side or surface of the deck 228.

On the other hand, the detector 224 and controller 226 are preferably located at or below a bottom side or surface of the deck 228. For example, these elements might be mounted to the bottom side of the deck 228 using adhesive, or might be mounted to other elements and thus be supported adjacent to the bottom side of the deck 228.

In one embodiment, the push-button 200 is configured to display information to a user or player, preferably identifying the input functionality of the push-button 200. This information may comprise, for example, one or more letters, numbers, words and/or symbols or the like. In one embodiment, a legend insert 213 may be located under the button cover 204 so as to be visible through the button cover 204. This insert might comprise a printed paper insert which bears information. In other embodiments, the button cover 204 itself might bear or provide the information. For example, the button cover 204 may have the configuration of button covers 300, 400 and 500 which are described in detail below.

In addition, one or more light-emitting or generating elements 232 may be provided, such as for illuminating portions of the push-button 200. As one example, one or more LEDs may be provided (such as in association with the PCB 226 to illuminate the ring 208 (which, in such a configuration, is preferably at least partially transparent, as noted above).

Figure 2B:
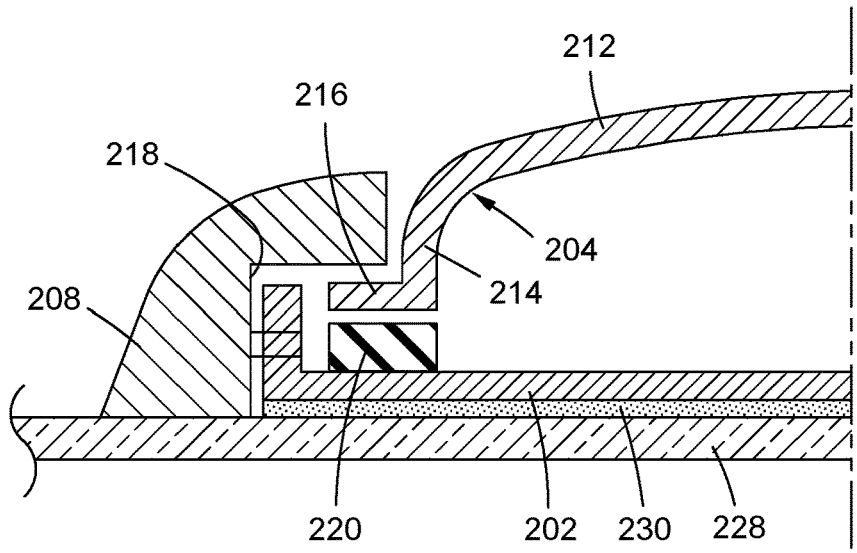
FIG. 2B illustrates another embodiment of a push-button in accordance with the invention.

Another embodiment of the button 200 is illustrated in FIG. 2B. This embodiment button 200 is similar to that illustrated in FIG. 2A, except that this embodiment button 200 may omit the tactile dome 206. As illustrated in FIG. 2B, this embodiment button cover 204 has a central portion 212 which is generally dome-shape (or convex—extending away from the base 202), a peripheral wall 214 which extends downwardly from the central portion 212 at the periphery thereof, and a peripheral tab 216 which extends generally laterally outwardly from the peripheral wall 214.

As best illustrated in FIG. 2B, the ring 208 may defines a slot or groove 218 which is located at an interior thereof. The groove 218 is configured to accept the peripheral tab 216 of the button cover 204 and the peripheral portion of the base 202.

In addition, a resilient pad 220 is preferably located under the peripheral tab 216 of the button cover 204. The resilient pad 220 may comprise, for example, an annular ring made of rubber or the like. The resilient pad 220 may be compressed when the user or player presses down on the button cover 204 in order to provide tactile feedback to the user. The resilient pad 220 may also generate an upward biasing force upon the button cover 204 when the user or player releases the button cover 204, aiding in moving the button cover 204 back upwardly.

Figure 2C:
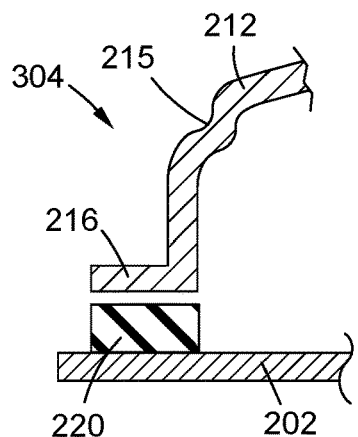
FIGS. 2C and 2D illustrate yet another embodiment of a push-button in accordance with the invention
Figure 2D:
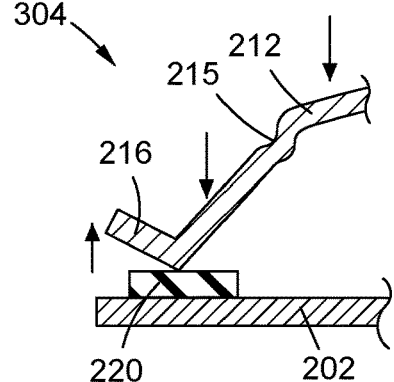

Yet another embodiment of the button 200 is illustrated in FIGS. 2C and 2D. This embodiment button is similar to that of FIG. 2B. In this embodiment, a transition 215 is provided in the button cover 204, such as between the central portion 212 and the peripheral wall 214. This transition 215 may comprise, for example, a discontinuity in the material forming the button cover 204, such as an offset in shape, thickness or material characteristics. This transition 215 preferably facilitates deformation of the button cover 204, and more particularly, displacement of the peripheral wall portion 214 from the central portion 212 of the button cover.

In this embodiment, the peripheral wall 214 may extend generally vertically when the button cover 204 is in its undepressed position, as illustrated in FIG. 2C. Then, as the central portion 212 of the button cover 204 is pressed downwardly, the peripheral tab 216 moves upwardly and the peripheral wall 214 moves towards a horizontal position, as best illustrated in FIG. 2D. In one embodiment, as this occurs, the user or player may receive tactile feedback which is generated by the deflection or deformation of the button cover 204 (and may hear audible feedback, such as a "click").

In addition, an upward biasing force may be generated by the button cover 204 itself, namely the deflection of the peripheral wall 214 towards the horizontal: this holds energy which is released when the user or player stops pressing on the button cover 204, which energy results in the peripheral wall 214 moving back towards its vertical position.

Of course, the button 200 might have other configurations, such as other means for generating actuation feedback (whether tactile, audible and/or visual).

As one example, it will be appreciated that while the button cover 204 might have a peripheral tab 216 which extends all of the way around the periphery of the button cover 204, the peripheral tab 216 might only be provided in certain locations (for example, if the button cover 204 is square, peripheral tabs 216 might be provided in the center of each side of the periphery of the button cover 204, etc., and then the one or more pads 220 might also only be provided in those locations). In this regard, while the push-button 200 has been primarily described relative to a variation which is oval or circular, the configuration of the push-button 200 may vary if it has other shapes.

The push-button 200 of the invention has numerous advantages. First, as noted above, the push-button 200 can be associated with a structure, such as a button deck 228, without requiring an aperture through the button deck 228. Existing buttons are generally mounted through apertures which are formed in the button deck. In the case of a glass button deck, such an aperture greatly weakens the glass. Use of the button may thus result in cracking and breaking of the glass. On the other hand, the integrity and strength of the button deck 228 remain uncompromised and much higher when the push-button 200 of the invention is utilized.

Another aspect of the invention is that the push-button 200 can be of a low profile while still providing desired tactile feedback. In one embodiment, the push-button 200 can have a low profile (a low height from the button deck 228 to the top of the push-button 200) because the push-button 200 has a low click ratio. In particular, the button cover 204 only needs to move a short distance in order to actuate the I/O mechanism 210 and to provide the user or player with tactile input regarding button actuation. In many existing push-buttons, actuation of the button is achieved by moving the button cover 204 vertically downwardly a sufficient distance to compress a spring and engage some other mechanism for providing feedback. In other situations, the button cover may need to be depressed sufficiently far down to touch a touch panel. This travel distance may make the button have a bad feel, and the tactile feedback may be harsh in that it simply comprises a hard stop hit of the button cap on the underlying panel. In accordance with the invention, however, tactile (and audible) feedback is generated through minimal movement of the button cover 204 due to deformation of the cover 204 itself.

Other embodiments of the invention comprise improved button covers and push-buttons having improved button covers, as well as methods of making such improved button covers.

Figure 3A:
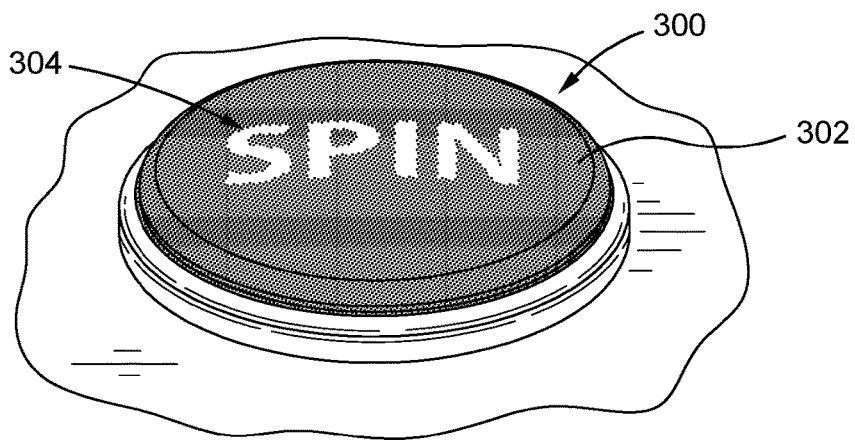
FIGS. 3A-3C illustrate a button cover in accordance with one embodiment of the invention.
Figure 3B:
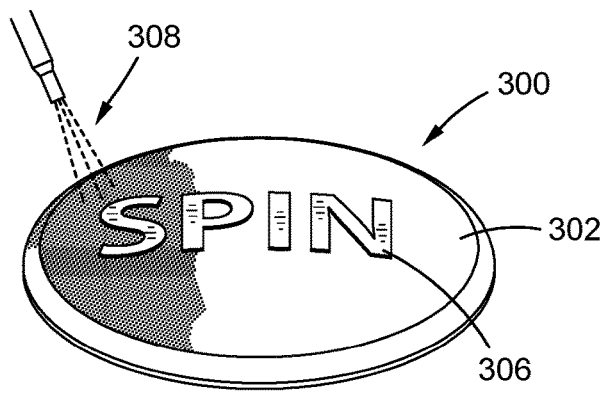
Figure 3C:
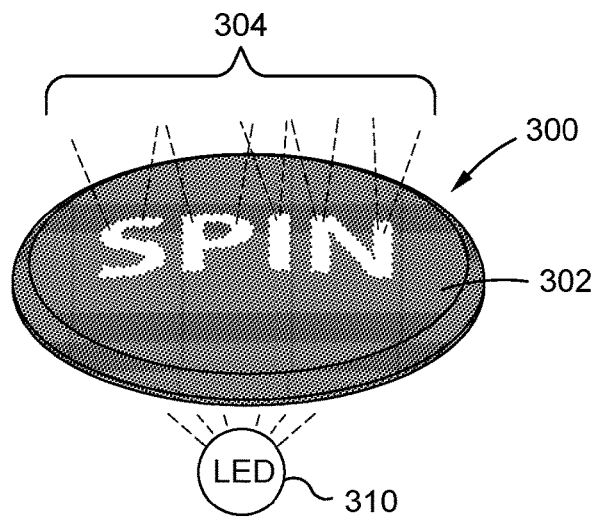

FIGS. 3A through 3C illustrate aspects of a glass button cover 300 and a method of making the same. The glass button cover 300 has a top side 302 and an opposing bottom side (not visible). As with the button cover or cap 204 described above, the glass button cover 300 may have various shapes and sizes. As illustrated, the glass button cover 300 might have a circular peripheral shape and be convex (e.g. define a top side 302 which extends outwardly from a horizontal plane when moving from the peripheral or outer edge of the button cover 300 to the center thereof). Of course, the glass button cover 300 might be oval or have other shapes and could be flat, concave or have other configurations.

In a preferred embodiment, the glass button cover 300 is constructed from glass, or at least a center or central section thereof comprises glass. The glass button cover 300 might comprise tempered or safety glass to further enhance its durability and reduce the risk of injury from any breaking thereof.

In one embodiment, the glass button cover 300 may be formed in a glass molding process. As noted above, in a preferred embodiment, the entire body of the glass button cover 300 comprises glass. In other embodiments, it is possible for the glass button cover 300 to have a central glass section and, for example, a peripheral edge, rim or outer portion which is constructed from other materials (such as metal, plastic or the like).

Preferably, the glass button cover 300 bears or is configured to convey information 304, such as information regarding the type of input/output associated with the button cover 300. The information 304 may comprise, for example, words, letters, symbols, numbers or the like.

In one embodiment of a method of making the glass button cover 300, different areas of the button cover 300 are configured to have different visual characteristics, such as differing levels of transparency/opacity, to thereby cause the button cover 300 to convey information.

As one example illustrated in FIG. 3B, the glass button cover 300 may be constructed from a body of clear or transparent glass. A masking 306 is applied at or over one or more areas of the glass button cover 300, the masking 306 having the configuration of information which is to be conveyed to a user, such as in the case of the example illustrated in FIG. 3B, the word "SPIN." Then, as illustrated in FIG. 3B, the top and/or bottom surface of the button cover 300 is etched or frosted, such as by etching 308 the top and/or bottom surface with acid or the like in all but the masked areas. It will be appreciated that the masking is applied to the side or sides being etched. As one example, if the top surface 302 is to be frosted, then the masking 306 is applied to the top surface.

Once the etching is complete, the masking 306 is removed. It one embodiment, the glass button cover 300 may be polished in the masked area in order to further enhance that area of the button cover 300.

FIG. 3C illustrates one embodiment of a glass button cover 300. As illustrated, the top surface 302 thereof has been frosted or etched, except in an area which defines information to be conveyed 304, in this case the word SPIN. As illustrated, when the button cover 300 is located over at least one light source 310 (such as an LED light, or incandescent, halogen or others), a greater amount of light is able to pass through the button cover 300 in the area that was masked than the remaining area that was etched/polished, whereby a user perceives the information to be conveyed 304, namely the word "SPIN" in this example.

Other methods may be utilized for causing the glass button cover 300 to convey information by having areas which are visibly different, such as having different levels of opacity.

In the example just described, a background portion or area of the button cover 300 has a first low level of transparency (e.g. a first high level of opacity) and other areas (which preferably define information to be conveyed) which has a second higher level of transparency than the first level (and thus a second low level of opacity).

In other embodiments, a button cover 300 has a background portion which has a first high level of transparency (such as by having polished surfaces) and one or more second areas (which preferably define information to be conveyed) having a second lower level of transparency (such as comprising areas which have been frosted, etched, painted, coated, etc.). As one example, the top and bottom surfaces of the button cover 300 might be polished. One or more areas which define information to be conveyed (such as letters, words, numbers, and/or symbols, etc.) might then be frosted by etching those areas (including, if necessary, by masking the remaining portions of the button surface(s)).

As indicated, differing levels of transparency (and thus opacity) may be achieved in various manners, such as by changing surface characteristics of the button cover 300 through etching (such as using chemicals or physical media such as by sandblasting), polishing, application of coatings (not limited to paints and ceramic coatings) and the like.

In an embodiment where a paint or other coating is utilized, the paint or other coating is preferably applied to the bottom surface of the button cover 300 (except in the areas which form the information to be conveyed) to prevent, for example, the paint or coating from being worn off of the button when touched by a player over time. It will be appreciated that the paint or other coating might have various colors and characteristics such as opacity. For example, a black or silver paint might be applied to the bottom surface or back of the button cover 300 except in certain areas which have a different level of opacity.

The glass button cover 300 of the invention has various benefits and advantages. First, in a configuration of a glass button cover 300 where one or more portions of the button comprise polished or clear glass (such as in areas defining information to be conveyed) or in background areas, there is improved optical clarity as compared to button covers which are constructed of plastic and the like. For example, colored LED light passing through clear/polished letter areas of the glass button cover 300 is brighter and more vivid than such light as is perceived after passing through a plastic button cover.

In addition, a glass button cover 300 has a higher density than a plastic cover and remains cooler as compared to plastic cover, thus resulting an improved feel to the user (that the button is cool and heavy, creating the impression, for example, of quality and durability as compared to a warm, flimsy plastic button cover).

Also, a glass button cover 300 generally provides a higher impact resistance than plastic button covers and, relative to both plastic and metal button covers, has a higher abrasion resistance, thus increasing the longevity of the push-button (including by retaining a desirable appearance, whereas plastic and metal button covers may easily get heavily scratched over time, ruining their aesthetic appearance).

FIGS. 4A through 4C illustrate aspects of a metal button cover 400 and a method of making the same. The metal button cover 400 may, like the other button covers described herein, have various shapes and sizes. Like the glass button cover 300, the metal button cover 400 may, for example, be general circular in peripheral shape and may be convex, but might have other shapes and configurations.

Once again, the metal button cover 400 has a top side or surface 402 and a bottom side or surface (not visible in the figures). The metal button cover 400 also bears information 404, such as words, letters, symbols, and/or numbers or the like.

As best illustrated in FIG. 4B, in one embodiment, the metal button cover 400 comprises a metal body 406 and an insert 408. The insert 408 is preferably transparent or generally transparent, thus permitting light to pass through it. As illustrated in FIG. 4B, the metal button cover 400 defines one or more apertures 410 therethrough. One or more portions of the insert 408 are configured to align with, engage, or extend into, the one or more apertures 410.

Additional aspects of the metal button cover 400 will be appreciated from a description of a method of making the button cover 400 and the user thereof. In one embodiment, a metal body 406 is provided. The body 406 might be stamped or the like from metal stock into the desired shape. Of course, the body 406 might be formed in other manners, including via casting, etc. The metal body 406 has the same overall shape as the button cover 400, and itself has a top side or surface, a bottom side or surface and a peripheral edge.

The top side and/or bottom side of the body 406 might be polished, painted, coated or the like in order to provide a desired finish. For example, the top side might be chrome plated or be coated with a ceramic material.

As illustrated in FIG. 4B, the body 406 defines one or more apertures 410. These might be formed in the stamping or casting process when the body 406 is formed, might be formed in a secondary stamping processes, or might be cut (such as using a laser, torch or the like).

In one embodiment, the one or more apertures 410 have the same shape as the information 404 which the button 400 bears. However, the apertures 410 could have other shapes (such as being circular, square or the like).

Next, the insert 408 is provided. As indicated, the insert 408 is preferably transparent or generally transparent. The insert 408 might be made of glass, plastic or the like and be cut, molded, etc.

In one embodiment, the insert 408 has the same shape as the metal body 406 and also has a top side or surface, an opposing bottom side or surface and a peripheral edge. The top side or surface is configured to abut or be positioned adjacent to the bottom surface of the metal body 406. The insert 408 may be mounted, connected or joined to the metal body 406, such as with adhesive, tabs or the like (in some embodiments, it is even possible for the insert 408 to be formed in the metal body 406, such as by filling the aperture 410 with molten plastic and allowing it to cool in place).

In one embodiment, one or more portions of the insert 408 are raised 412, such as by projecting outwardly beyond a remaining portion of the top surface of the insert 408. These raised portions 412 are configured to extend through the aperture(s) 410 in the metal body 406. In one embodiment, the raised portions 412 have the same shape as the apertures 410. For example, in the example illustrated in FIG. 4B, the apertures 410 have the form of the letters SPIN and the raised areas 412 have the same shape and are preferably about the same size as the apertures 410 (but are slightly smaller to extend therethrough). The raised areas 412 might extend flush with the top surface of the metal body 406 or might extend beyond the top surface of the button body 406.

As illustrated in FIG. 4C, when at least one light source 414 is positioned beneath the button cover 400, such as below the bottom side or surface of the insert 408, light passes through the raised areas 412 of the insert 408 and the aperture(s) 410 in the metal body 406 (but not through the remaining portions of the body 406), so as to illuminate the information 404.

Like the glass button cover 300 described above, the metal button cover 400 has a higher density than a plastic cover and remains cooler as compared to plastic cover, thus resulting an improved feel to the user (that the button is cool and heavy, creating the impression, for example, of quality and durability as compared to a warm, flimsy plastic button cover).

Also, the metal button cover 400 generally provides a higher impact resistance and tensile strength than plastic button covers, thus increasing the longevity of the pushbutton. Also, the aesthetic finish of such a metal button is generally superior as compared, for example, to plastic or other button covers having similar finishes.

Figure 5A:
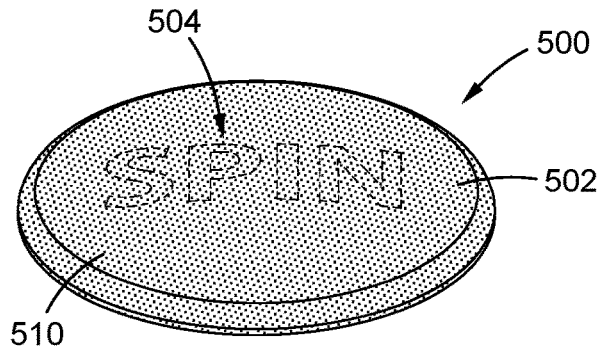
FIGS. 5A-5C illustrate a button cover in accordance with yet another embodiment of the invention.
Figure 5B:
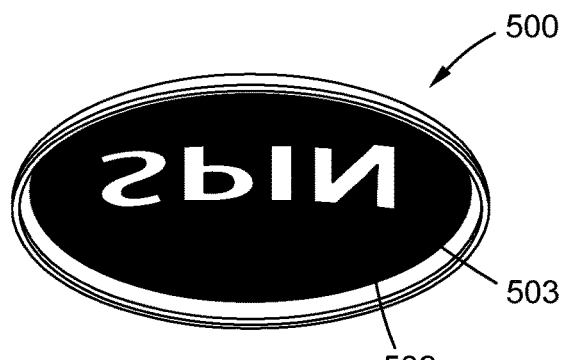
Figure 5C:
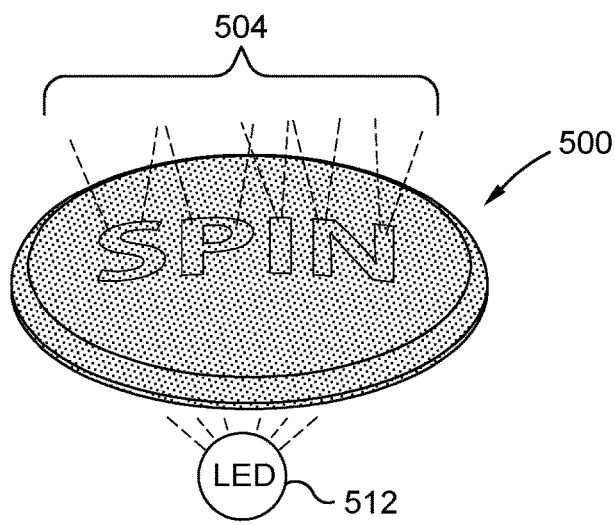

FIGS. 5A through 5C illustrate aspects of a thin film button cover 500 and a method of making the same. The thin film button cover 500 may, like the other button covers described herein, have various shapes and sizes. Like the button covers described above, this button cover 500 may, for example, be general circular in peripheral shape and may be convex, but might have other shapes and configurations.

Referring to FIGS. 5A and 5B, once again, the thin film button cover 500 has a top side or surface 502 and a bottom side or surface 503. The thin film button cover 500 also bears information 504, such as words, letters, symbols, numbers or the like.

Various aspects of the thin film button cover 500 will be appreciated from a description of methods of manufacturing and use of the button 500. In one embodiment, a button body is provided. The button body preferably comprises a translucent material such as plastic, glass or the like. The body might be created or formed in various manners, such as depending on the material from which it is constructed. For example, the button body might be molded or the like.

In one embodiment, as illustrated in FIG. 5B, a blocking layer 508 is applied to the button cover 500. The blocking layer 508 preferably comprises an opaque or substantially opaque layer which substantially blocks light from passing therethrough.

The blocking layer 508 may be applied to the top side 502 or, as illustrated in FIG. 5B, the bottom side 503 of the button body. The blocking layer 508 might comprise, for example, black paint. However, the blocking layer 508 might comprise other materials and be applied in various manners, including spraying, dipping, coating, deposition, etc.

Most preferably, the blocking layer 508 is not applied in the areas of the desired information 504. Thus, one or more areas comprising the information 504 may be masked to prevent the blocking layer 508 from being applied in those areas.

In another step, a thin film 510 is applied to the button cover 500. In a preferred embodiment, the thin film 510 comprises a metallic material which is applied by a thin film vacuum deposition process, such as a physical vapor deposition process, to thus create an extremely thin film coating on the button cover 500. The thin film 510 might be applied over the blocking layer 508 or, in a preferred embodiment, is applied to the top side 502 of the button cover 500 while the blocking layer 508 is applied to the bottom side 503. The material comprising the thin film 510 is preferably generally opaque, but wherein layer of material is so thin that sufficient light is permitted to pass therethrough as to be visible to a viewer.

In one embodiment, the thin film 510 might be polished to create a somewhat reflective or mirror-like finish.

This thin film button cover 500 comprises an improvement upon plastic and similar button covers by providing a unique visual effect and appearance. In particular, when the thin film button cover 500 is not back-lit, the information 504 is not visible to the player. Instead, the button cover 500 appears to comprise a solid metallic button to the user or player. However, as illustrated in FIG. 5C, when the button cover 500 is back-lit, such as by one or more LEDs 512 or other light-emitting elements, light is blocked by the blocking layer 508, but is permitted to pass through the areas where the blocking layer 508 was not applied. Further, some of the light is permitted to pass through the thin film layer 510 because it is such a thin layer. Thus, as illustrated in FIG. 5C, a user or player visibly perceives the information 504 in those areas where light passes through the button cover 500.

In a preferred embodiment, the button covers 300, 400, 500 which were just described are used with a push-button 200 such as that illustrated in FIGS. 2A-2D and described above. However, the button covers 300, 400, 500 might be used with push-buttons having other configurations.

In general, the button covers 300, 400, 500 could be used with any variety of push-buttons having some sort of button body (whether a housing, base or the like) and at least one I/O mechanism which is configured to receive an input from movement of the button cover from an undepressed position to a depressed position and to generate an output in response to the input.

Figure 6:
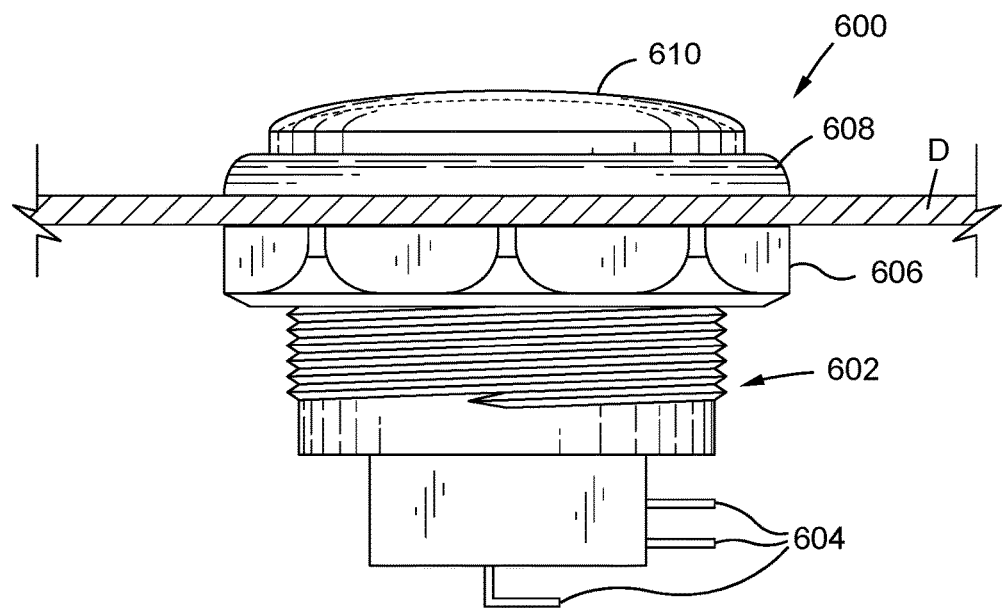
FIG. 6 illustrates another embodiment of a push-button to which button covers of the invention may apply.

For example, FIG. 6 illustrates one embodiment of a push-button 600 to which the button covers of the invention may apply. The push-button has a housing 602, one or more electrical connectors 604, a lock ring 606, a bezel 608, a button cover 610, and one or more actuating elements (not shown). The housing 602 may have various shapes and be of various sizes and preferably houses and/or supports various elements of the push-button 200. In one embodiment, the push-button 600 may be mounted to a button deck D. The button deck D might comprise, for example, a metal or plastic mounting plate. In other embodiments, the button deck D might comprise glass, including an LCD panel and/or LCD panel with an associated touch screen. The push-button 600 may be mounted by extending a portion of the housing 602 through an opening in the button deck D. The push-button 600 may be secured, for example, by threading the lock ring 606 onto the housing 602 until it abuts the button deck D and the bezel 608 on the other side of the button deck D engages the button deck D.

As illustrated, the push-button 600 is preferably arranged so that the bezel 608 and the button cover 610 are located on a top side of the button deck D so as to be viewable to and accessible by a user or player (while the locking ring 606, electronic connectors 604 and the like are located below the button deck D.

A switch (not illustrated) is located inside of the housing 602. When the user pushes down on the button cover 610, the switch is actuated, thus generating a switch output via the electrical connectors 604. One or more biasing elements (not illustrated), such as a spring, may be located in the housing 602 for biasing the button cover 610 back upwardly to an undepressed position.

While this push-button 600 does not have the advantages of the push-button 200 described above, this push-button 600 can be modified with one of the advantageous button covers 300, 400, 500 described above.

Figure 7:
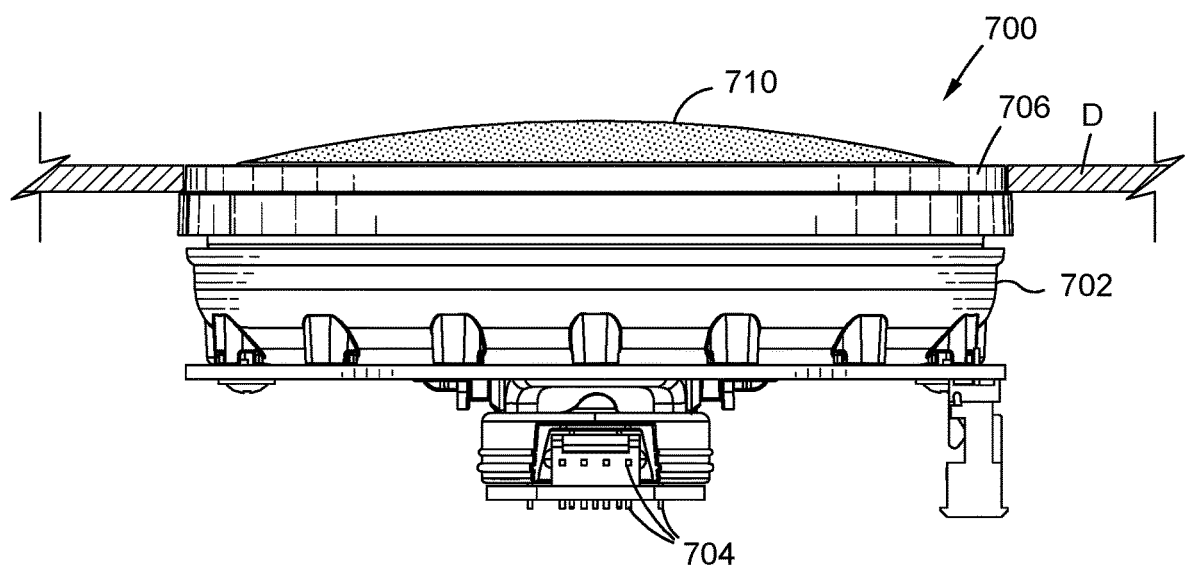
FIG. 7 illustrates yet another embodiment of a push-button to which button covers of the invention may apply.

FIG. 7 illustrates another embodiment of a push-button 700 to which aspects of the present invention, including the button covers described above, may apply. The push-button 700 generally has a housing 702, one or more electrical connectors 704, a ring 706, a button cover 710, and one or more actuating elements (not shown).

The button cover 710 preferably has a configuration of one of the button covers 300, 400, 500 of the present invention.

The ring 706 may be configured to transmit light, such as by comprising a transparent or translucent material. One or more illumination devices may be configured to emit light which then passes through the ring 706.

This embodiment button 700 is particularly suited to be mounted to a button deck D (or other supporting structure) so that all but the button cover 710 of the button 700 is at or below the top of the button deck D. In this embodiment, the button cover 710 extends upwardly or outwardly from inside of the ring 706. The ring 706 has a top surface. In one embodiment, the top of the ring 706 is generally planar, but it could have other shapes. In this embodiment, the button 700 is mounted so that the top of the ring 706 is at the same level as, or "flush" with the top of the button deck D. In this respect, the button 700 may be referred to as a "flush mount" button.

In this configuration, only the portion of the button 700 which the user actuates, e.g. the button cover 710, may extend above the top of the button deck D. The remaining portions of the button 700 are all located at or below the top surface of the button deck D. For example, as illustrated in FIG. 7, the button 700 may be mounted at or to the bottom of the button deck D so that the majority of the button 700 is located below the button deck D. Of course, the button 700 might be mounted to the button deck D or to an associated mounting structure in various manners.

It is noted that while a push-button switch may be configured to generate an output in response to movement of a button cover herein from a first undepressed position to a second depressed position, an output might be only generated in response to movement of the button cover back from said depressed to the undepressed position or more than one output could be generated by the push-button, such as one output due to movement of the button cover from the undepressed position to the depressed position and another due to movement of the button cover from the depressed position back to the undepressed position.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A push-button for mounting to a portion of a gaming machine without requiring a mounting aperture through said portion, comprising:
   a push-button portion comprising:
      a base having a top side and an opposing bottom side for connection to a top of said portion of said gaming machine;
      an annular lock ring connected to said base, said annular lock ring defining a central opening;
      a button cover at least partially located in said central opening of said annular lock ring, said button cover movable between a first undepressed position and a second depressed position;
      a tactile dome located between said base and said button cover which is configured to create tactile feedback when said button cover is moved from said first undepressed position and said second depressed position; and
      at least one input/output actuator, said at least one actuator associated with said button cover and movable therewith when said button cover is moved from said first undepressed position to said second depressed position;

and
    a detector portion comprising:
        a body, said body for connection to a bottom of said portion of said gaming machine below said push-button portion, whereby said portion of said gaming machine is located between said push-button portion and said detector portion; and
        at least one detector associated with said body, said at least one detector generating an output in response to the detection of movement of said at least one actuator towards said at least one detector.

2. The push-button in accordance with claim 1, wherein said tactile dome is deformable between a first position and a second position.

3. The push-button in accordance with claim 2, wherein said tactile dome generates a tactile output when moved from at least one of said first position to said second position and said second position to said first position.

4. The push-button in accordance with claim 3, wherein said tactile dome generates an audible output when moved from at least one of said first position to said second position and said second position to said first position.

5. The push-button in accordance with claim 1, wherein said at least one actuator comprises a magnet mounted to said button cover and said at least one detector comprises a Hall-effect sensor.

6. The push-button in accordance with claim 1, wherein said at least one detector is located below, and generally vertically aligned with, said at least one actuator.

7. The push-button in accordance with claim 1, wherein said body of said detector portion comprises a circuit board comprising a controller.

8. The push-button in accordance with claim 7, wherein said at least one detector provides an output to said controller and said controller provide a signal to a gaming machine controller, said signal dependent on said output to said controller.

9. The push-button in accordance with claim 1, wherein said annular ring is light transmitting or illuminated.

10. The push-button in accordance with claim 1, wherein said portion of said gaming machine comprises a console.

11. A push-button for mounting to a portion of a gaming machine without requiring a mounting aperture through said portion, comprising:
    a push-button portion comprising:
        a base having a top side and an opposing bottom side for connection to a top of said portion of said gaming machine;
        an annular lock ring connected to said base, said annular lock ring defining a central opening;
        a button cover at least partially located in said central opening of said annular lock ring, said button cover movable between a first undepressed position and a second depressed position;
        a resilient pad located between said top side of said base and said button cover, said resilient pad configured to create tactile feedback when said button cover is moved from said first undepressed position to said second depressed position; and
        at least one input/output actuator, said at least one actuator associated with said button cover and movable therewith when said button cover is moved from said first undepressed position to said second depressed position;
    and
    a detector portion comprising:
        a body, said body for connection to a bottom of said portion of said gaming machine below said push-button portion, whereby said portion of said gaming machine is located between said push-button portion and said detector portion; and
        at least one detector associated with said body, said at least one detector generating an output in response to the detection of movement of said at least one actuator towards said at least one detector.

12. The push-button in accordance with claim 11, wherein said at least one actuator comprises a magnet mounted to said button cover and said at least one detector comprises a Hall-effect sensor.

13. The push-button in accordance with claim 11, wherein said at least one detector is located below, and generally vertically aligned with, said at least one actuator.

14. The push-button in accordance with claim 11, wherein said annular ring is light transmitting or illuminated.

15. The push-button in accordance with claim 11, wherein said resilient pad is located between said base and a peripheral wall of said button cover and biases said button cover upwardly.

16. A push-button for mounting to a portion of a gaming machine without requiring a mounting aperture through said portion, comprising:
    a push-button portion comprising:
        a base having a top side and an opposing bottom side for connection to a top of said portion of said gaming machine;
        an annular lock ring connected to said base, said annular lock ring defining a central opening;
        a button cover at least partially located in said central opening of said annular lock ring, said button cover movable between a first undepressed position and a second depressed position, said button cover having a central portion and a peripheral wall which extends downwardly from said central portion at one or more locations, said peripheral wall having a discontinuity therein which is configured to permit at least a portion of said peripheral wall to deflect outwardly and create tactile feedback when said button cover is moved from said first undepressed position to said second depressed position; and
        at least one input/output actuator, said at least one actuator associated with said button cover and movable therewith when said button cover is moved from said first undepressed position to said second depressed position;
    and
    a detector portion comprising:
        a body, said body for connection to a bottom of said portion of said gaming machine below said push-button portion, whereby said portion of said gaming machine is located between said push-button portion and said detector portion; and
        at least one detector associated with said body, said at least one detector generating an output in response to the detection of movement of said at least one actuator towards said at least one detector.

17. The push-button in accordance with claim 16, wherein said at least one actuator comprises a magnet mounted to said button cover and said at least one detector comprises a Hall-effect sensor.

18. The push-button in accordance with claim 16, wherein said at least one detector is located below, and generally vertically aligned with, said at least one actuator.

19. The push-button in accordance with claim 16, wherein said annular ring is light transmitting or illuminated.

20. The push-button in accordance with claim 16, wherein said discontinuity comprises at least one of: a change in thickness of said peripheral wall, a change in shape, and a change in material.

* * * * *